(12) United States Patent
Kim et al.

(10) Patent No.: US 11,853,350 B2
(45) Date of Patent: Dec. 26, 2023

(54) METHOD FOR UPDATING QUERY INFORMATION FOR TRACING TARGET OBJECT FROM MULTI-CAMERA AND MULTI-CAMERA SYSTEM PERFORMING THE SAME

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Haksub Kim, Seoul (KR); Seungho Chae, Seoul (KR); Yoonsik Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 129 days.

(21) Appl. No.: 17/537,790

(22) Filed: Nov. 30, 2021

(65) Prior Publication Data

US 2023/0061827 A1 Mar. 2, 2023

(30) Foreign Application Priority Data

Aug. 24, 2021 (KR) .................. 10-2021-0111539

(51) Int. Cl.
*G06F 16/00* (2019.01)
*G06F 16/532* (2019.01)
*H04N 7/18* (2006.01)
*G06V 10/62* (2022.01)
*G06V 10/75* (2022.01)
(Continued)

(52) U.S. Cl.
CPC ............ *G06F 16/532* (2019.01); *G06F 16/55* (2019.01); *G06F 16/5854* (2019.01); *G06F 18/21* (2023.01); *G06F 18/24* (2023.01); *G06V 10/62* (2022.01); *G06V 10/75* (2022.01); *G06V 10/764* (2022.01); *G06V 20/52* (2022.01);
(Continued)

(58) Field of Classification Search
CPC .... G06F 16/532; G06F 16/55; G06F 16/5854; G06F 18/21; G06F 18/24; G06V 10/62; G06V 10/75; G06V 10/764; G06V 20/52; G06V 2201/07; H04N 7/18; H04N 7/181; H04N 23/90; H04N 23/61; H04N 23/695
See application file for complete search history.

(56) References Cited

U.S. PATENT DOCUMENTS

| 10,032,301 B2 | 7/2018 | Balasubramanian et al. |
| 10,621,473 B1 | 4/2020 | Kim et al. |

(Continued)

FOREIGN PATENT DOCUMENTS

| KR | 10-1498985 B1 | 3/2015 |
| KR | 10-2018-0128350 A | 12/2018 |

(Continued)

*Primary Examiner* — Jared M Bibbee
(74) *Attorney, Agent, or Firm* — CANTOR COLBURN LLP

(57) ABSTRACT

Embodiments relate to a method for updating query information for tracing a target object from multi-camera including receiving a query information update command including query information for tracing a target object from multi-camera, searching for at least one image displaying the target object among a plurality of images captured by the multiple cameras, and updating the query information of a query image based on the at least one found image, and a multi-camera system performing the same.

14 Claims, 14 Drawing Sheets

(51) Int. Cl.
    *G06V 20/52*     (2022.01)
    *G06F 16/583*     (2019.01)
    *G06F 16/55*     (2019.01)
    *G06V 10/764*     (2022.01)
    *G06F 18/21*     (2023.01)
    *G06F 18/24*     (2023.01)
    *H04N 23/90*     (2023.01)

(52) U.S. Cl.
    CPC ............... *H04N 7/18* (2013.01); *H04N 23/90* (2023.01); *G06V 2201/07* (2022.01)

(56) References Cited

U.S. PATENT DOCUMENTS

| | | | |
|---|---|---|---|
| 2012/0155778 A1* | 6/2012 | Buchmueller | G06F 16/583 382/209 |
| 2014/0193077 A1* | 7/2014 | Shiiyama | G06F 16/583 382/190 |
| 2018/0341803 A1 | 11/2018 | Matsushita et al. | |
| 2019/0019016 A1* | 1/2019 | Ikeda | H04N 23/611 |
| 2019/0162507 A1* | 5/2019 | Li | G06T 11/001 |
| 2021/0374971 A1* | 12/2021 | Zhou | G06T 7/246 |

FOREIGN PATENT DOCUMENTS

| | | |
|---|---|---|
| KR | 10-2020-0043985 A | 4/2020 |
| KR | 10-2020-0094640 A | 8/2020 |
| KR | 10-2020-0094844 A | 8/2020 |
| KR | 10-2021-0092707 A | 7/2021 |
| WO | 2019/040213 A1 | 2/2019 |

* cited by examiner

SD camera (300,000 pixels) 720 X 480

FHD camera (2,000,000 pixels) 1920 X 1080

METHOD FOR UPDATING QUERY INFORMATION FOR TRACING TARGET OBJECT FROM MULTI-CAMERA AND MULTI-CAMERA SYSTEM PERFORMING THE SAME

CROSS-REFERENCE TO RELATED APPLICATION

This application claims priority to Korean Patent Application No. 10-2021-0111539, filed on Aug. 24, 2021, and all the benefits accruing therefrom under 35 U.S.C. § 119, the contents of which in its entirety are herein incorporated by reference.

TECHNICAL FIELD

Embodiments of the present disclosure relate to a method for updating query information for tracing a target object from multi-camera to improve the matching performance of re-identification technology used to trace the path of the specific target object in a multi-camera environment, and a multi-camera system performing the same.

NATIONAL RESEARCH AND DEVELOPMENT SUPPORT

This work was supported by the Basic Science Research Program (Grant No. NRF-2018M3E3A1057288) of the National Research Foundation (NRF) funded by the Ministry of Science and ICT, Republic of Korea.

BACKGROUND ART

Recently, with the growing public interest in security/safety, the number of closed-circuit television (CCTV) cameras installed in the roads, streets and buildings is increasing sharply. It is reported that a person s exposure to CCTVs 83.1 times on average per day in the metropolitan area. Thus, an image analysis system using a large number of CCTV cameras receives inputs of more than a few thousand to a few tens of thousands of images per second.

It is essential to accurately search for a desired target object in a large number of input images. Additionally, even after identifying the target object in an image captured by any one camera, it is important to re-identify the target object in images captured by other cameras and continuously trace the path of the target object.

FIG. 1 is a schematic diagram showing the operation of the image analysis system using a large number of CCTV cameras according to an embodiment of the related art.

Referring to FIG. 1, the image analysis system of the related art searches for a specific object in images captured by multiple CCTVs using only fixed query information inputted by a user at the start of search. Since the query information is fixed, it takes a long time to find a specific user by searching a large number of CCTV images.

The image analysis system of the related art is inadequate to satisfy the need to detect the path of a specific object (for example, a specific person, a specific type of human/vehicle) requested by a user in a large number of input images in a short time when an emergency event such as a crime or a missing person incident happens.

DISCLOSURE

Technical Problem

According to the embodiments of the present disclosure, there is provided a method for updating query information for tracing a target object from multi-camera, including searching for other query image based on an input query image and updating information of the found other query image as query image information, thereby improving specific object matching performance, and a multi-camera system performing the same.

Technical Solution

A method for updating query information for tracing a target object from multi-camera according to an aspect of the present disclosure may be performed by a system including multiple cameras and an image analysis server. The method may include receiving a query information update command including query information for tracing the target object from the multiple cameras—the query information including at least one of a query image displaying the target object, features of the query image extracted from the query image, or attributes of the target object, searching for at least one image displaying the target object among a plurality of images captured by the multiple cameras, and updating the query information of the query image based on the at least one found image.

In an embodiment, the method may further include extracting the features of the query image from the query image, before searching for the at least one image or updating the query information, when the query information update command includes the query image and does not include the features of the query image.

In an embodiment, updating the query information may include obtaining new features of the query image based on the features of the at least one found image extracted from the image and the features of the query image, and updating the query information based on the new features of the query image.

In an embodiment, obtaining the new features of the query image may include calculating a representative value for the features of the at least one found image and the features of the query image as the new features of the query image. The representative value is an average or maximum value of a feature value of the image and a feature value of the query image.

In an embodiment, obtaining the new features of the query image may include directly obtaining, as the new features, at least some of remaining features except the features that match the features of the query image among the features of the at least one found image.

In an embodiment, obtaining the new features of the query image may include obtaining, as the new features of the query image, an output result calculated by applying input features to a fully connected layer pre-stored in the image analysis server. The input features are a concatenation of the features of the at least one found image and the features of the query image.

In an embodiment, the query information may further include capture time information of the camera. The method may further include classifying the at least one found image based on the capture time information in the query information for each preset capture time slot. Here, obtaining the new features of the query image may include generating the new features of the query image for each capture time slot to update the query information for each capture time slot.

In an embodiment, the capture time slot may be set on the basis of a point having a relatively large change in background luminance for each capture time in a background luminance distribution in one day.

In an embodiment, the query information further includes specification information of the camera. The method may further include classifying the at least one found image based on the specification information in the query information for each specification of the camera. Here, obtaining the new features of the query image may include generating the new features of the query image for each specification of the camera to update the query information for each specification.

In an embodiment, the specification information of the camera may include at least one of camera type, image format, pixel or resolution.

In an embodiment, searching for the at least one image displaying the target object may include determining each image of which the features match the features of the query image as an image displaying the target object, for each of the plurality of images obtained from the multiple cameras.

In an embodiment, searching for the at least one image displaying the target object may include determining an object in each image as the target object based on a matching level or a matching number between attributes of the corresponding object and the attributes of the target object, for each of the plurality of images obtained from the multiple cameras.

In an embodiment, the fully connected layer may be pre-trained to increase an importance of unique features shared between an object having the input features and the target object.

A computer-readable recording medium according to another aspect of the present disclosure may record a program for performing the method according to the above-described embodiments.

A multi-camera system according to still another aspect of the present disclosure may include multiple cameras to capture an object to generate an image, and an image analysis server to receive the images from the multiple cameras. The image analysis server is configured to receive a query information update command including query information for tracing a target object from the multiple cameras—the query information including at least one of a query image displaying the target object, features of the query image extracted from the query image, or attributes of the target object, search for at least one image displaying the target object among the plurality of images captured by the multiple cameras, and update the query information of the query image based on the at least one found image.

Advantageous Effects

The multi-camera system according to an aspect of the present disclosure may update query information of a query image displaying a target object to improve specific object matching performance of the system.

In particular, the query information is updated using a re-identified patch that meets the condition of the query information in an image of the system, thereby achieving adaptive specific object search (or tracing) in a multi-camera environment. As a result, it is possible to achieve efficient search based on multi-angle user images and input images.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some elements to which a variety of modifications such as exaggeration and omission are applied.

BEST MODEL

Hereinafter, the embodiments of the present disclosure will be described in detail with reference to the drawings.

However, it should be understood that this is not intended to limit the present disclosure to a particular embodiment, and includes a variety of modifications, equivalents and/or alternatives of the embodiments of the present disclosure. In relation to the description of the drawings, like reference signs may be used to denote like elements.

The term "comprises", "comprising", "includes" or "including" when used in this specification, specifies the presence of the corresponding features (for example, integers, functions, operations, steps, components, elements and/or constituents), but does not preclude the presence or addition of one or more other features.

It should be understood that when an element is referred to as being "connected to" or "coupled to" another element, it can be directly connected or coupled to the other element or intervening elements may be present. In contrast, it should be further understood that when an element is referred to as being "directly connected to" or "directly coupled to" another element, there is no intervening element.

The terms "first", "second" and the like as used in a variety of embodiments may represent a variety of elements irrespective of order and/or importance, and do not limit the corresponding elements. These terms may be used to distinguish one element from another. For example, a first element and a second element may represent different elements irrespective of order or importance.

The term "configured (or set) to" as used herein may be interchangeably used with, for example, "suitable for", "having the capacity to", "designed to", "adapted to", "made to" or "capable of" according to circumstances. The term "configured (or set) to" does not necessarily represent "specifically designed to" in hardware aspect. Instead, in a certain circumstance, "a device configured to" may represent that the device "may—with" other devices or components. For example, "a processor configured (or set) to perform A, B and C" may represent a dedicated processor (for example, an embedded processor) for performing the corresponding operation, or a generic-purpose processor (for example, a Central Processing Unit (CPU) or an application processor) for performing the corresponding operation by running at least one software program stored in a memory device.

Figure 1:
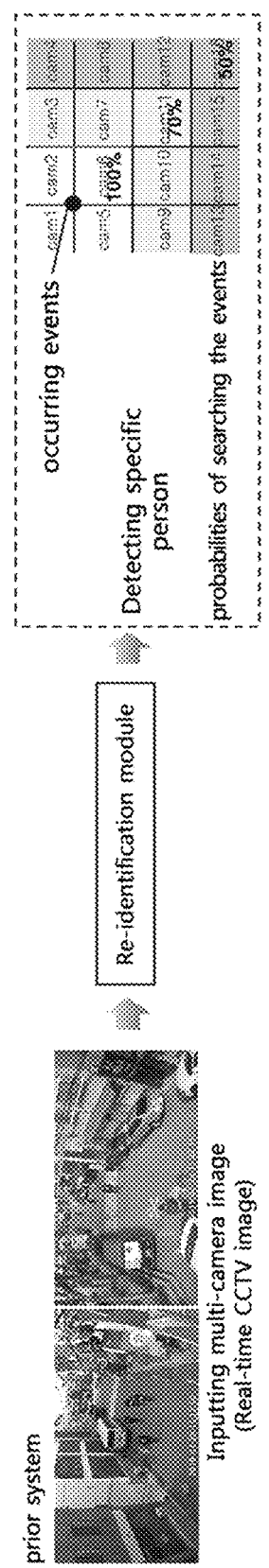
FIG. 1 is a schematic diagram of a multi-camera system according to an embodiment of the related art.
Figure 2:
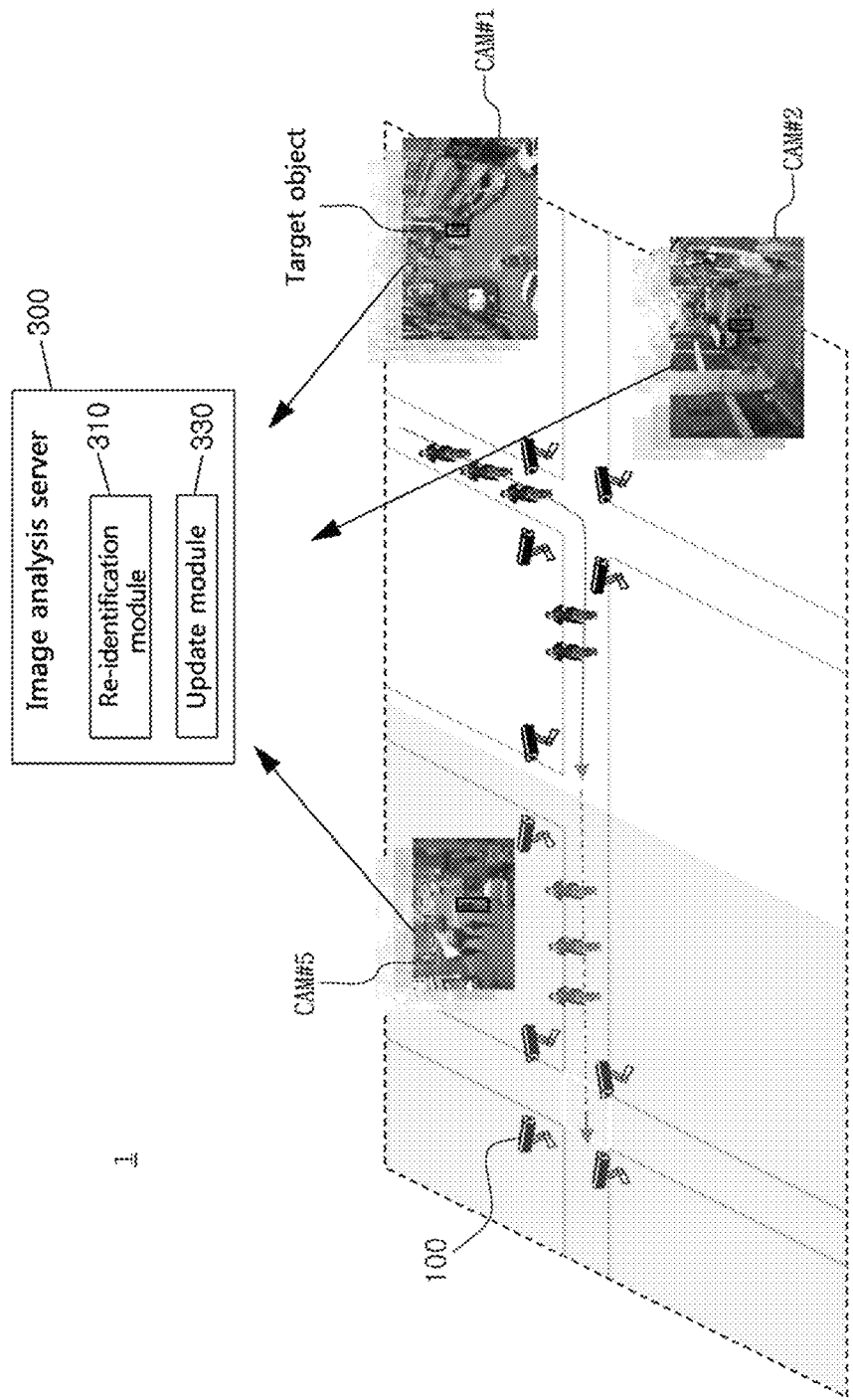
FIG. 2 is a block diagram of a multi-camera system according to an aspect of the present disclosure.
Figure 3:
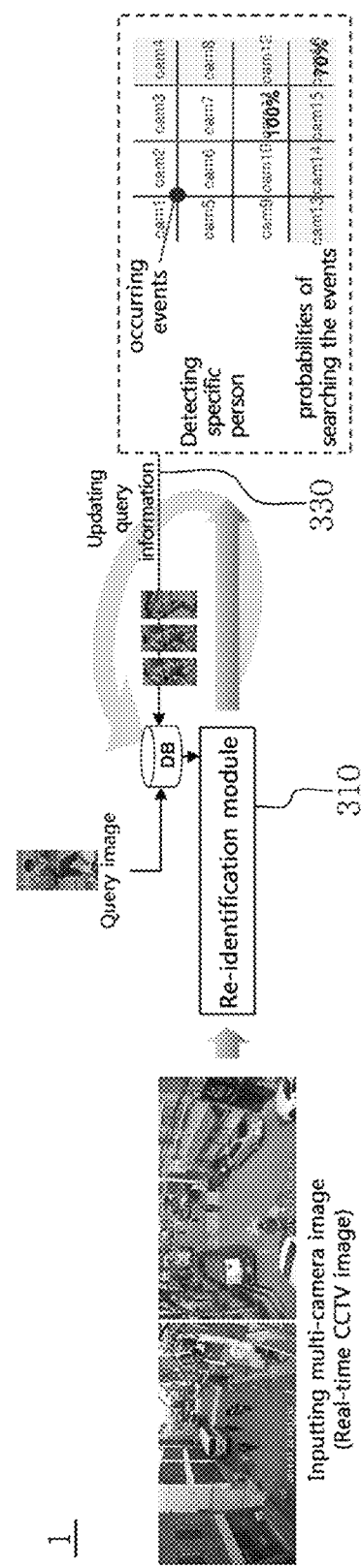
FIG. 3 is a schematic diagram of a query information update operation performed by the multi-camera system of FIG. 2.

FIG. 2 is a block diagram of a multi-camera system according to an aspect of the present disclosure, and FIG. 3 is a schematic diagram of a query information update operation performed by the multi-camera system of FIG. 2.

Referring to FIGS. 2 and 3, the multi-camera system 1 includes multiple cameras 100 and an image analysis server 300. In particular embodiments, the image analysis server 300 may include a re-identification module 310 and an update module 330.

The multi-camera system 1 according to embodiments may have aspects of entirely hardware, entirely software, or partly hardware and partly software. For example, the multi-camera system 1 may refer collectively to hardware capable of processing data and software that enables the hardware to operate. The term "unit", "module", "device" or "system" as used herein is intended to refer to a combination of hardware and software that runs by the corresponding hardware. For example, the hardware may be a computing device capable of data processing, including CPU, Graphic Processing Unit (GPU) or any other processor. Additionally, the software may refer to a process being executed, an object, an executable, a thread of execution and a program.

The camera 100 is an image capture device configured to receive a physical signal and generate an image displaying an object and/or a background or a video including continuous images. The camera 100 may include an image sensor, a photographing device, a camcorder, a closed-circuit television (CCTV) and any other image capture device.

The multi-camera system 1 includes the multiple cameras 100. When a specific object moves in the capture range of all or part of the multi-camera system 1, at least one image of the specific object is obtained. Some or all of the at least one image may have different capture times. Alternatively, some or all of the at least one image may have different capture spaces.

Figure 4:
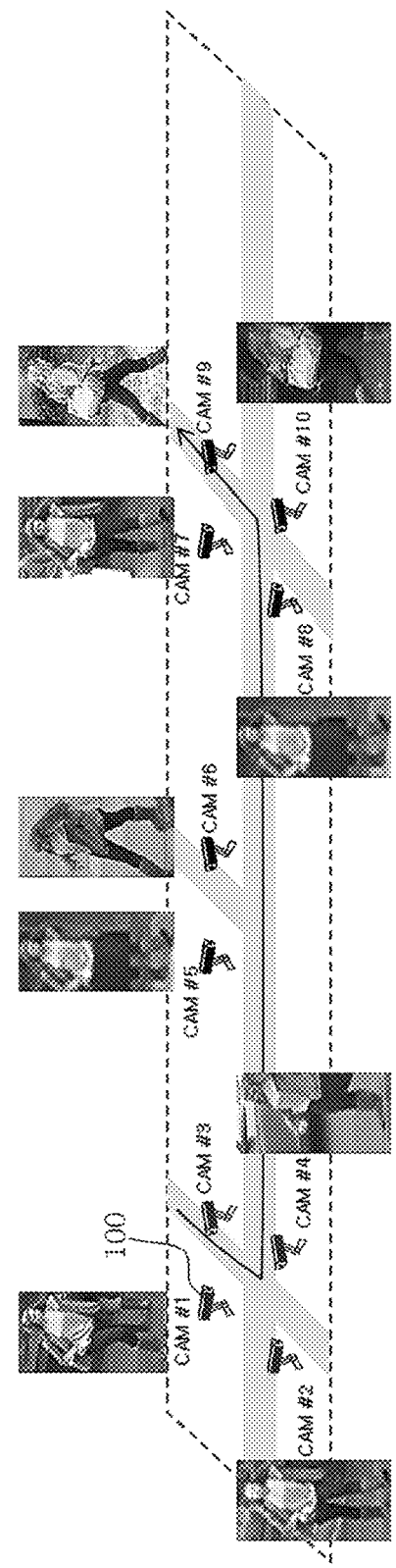
FIG. 4 shows that the multi-camera system captures a variety of image according to an embodiment of the present disclosure.
Figure 5:
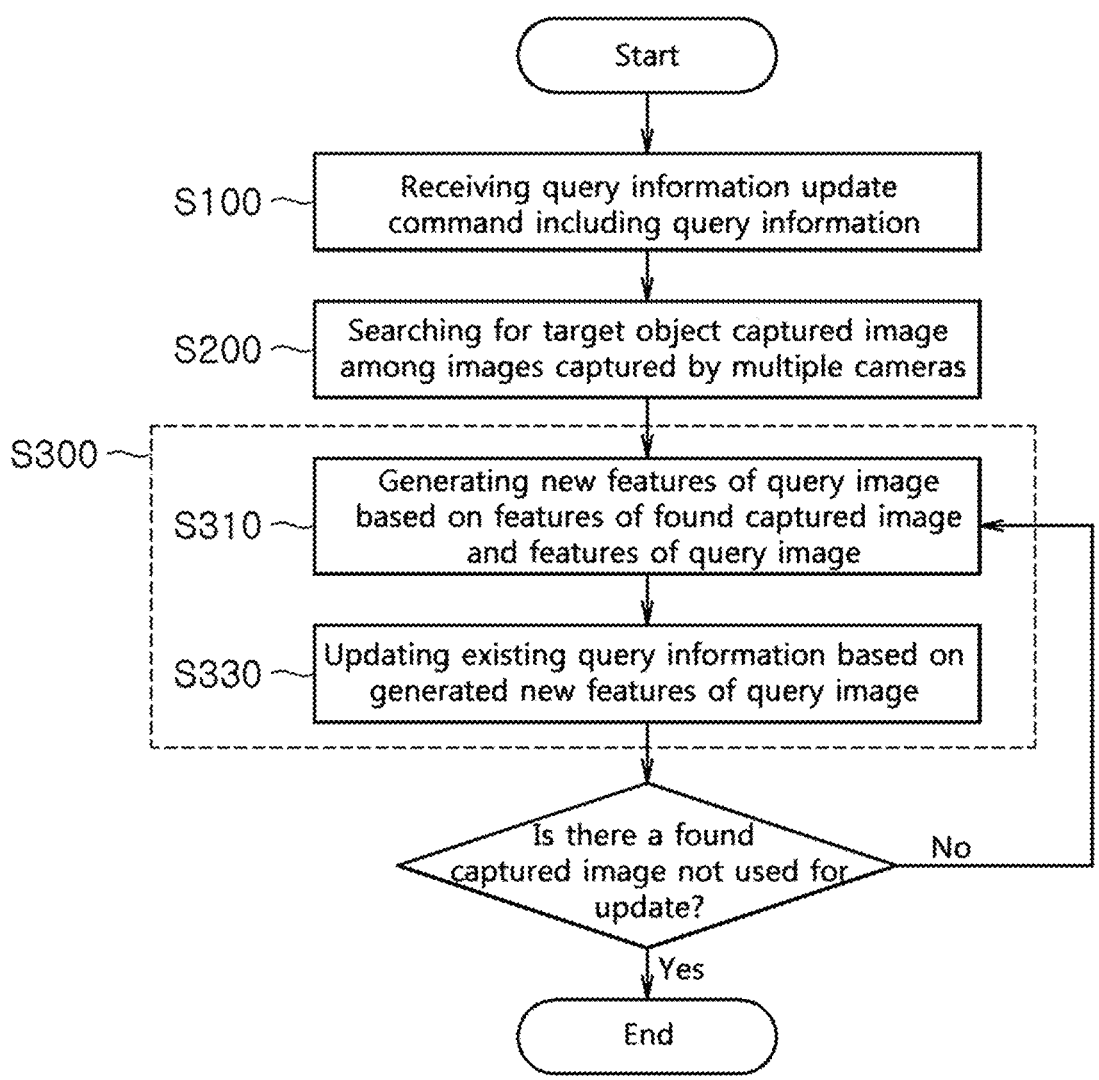
FIG. 5 is a schematic diagram of a method for updating query information for tracing a target object from multi-camera according to another aspect of the present disclosure.

FIG. 4 shows that the multi-camera system captures a variety of image according to an embodiment of the present disclosure.

Referring FIG. 4, the variety of image captured by the multiple cameras 100 input into the multi-camera system 1.

The camera 100 may be further configured to generate image data and detailed information associated with the generated image. The detailed information includes identification information (for example, an identifier) of the camera 100 having captured the image, location information of the camera 100, image capture time, and/or identification information of the image data. For example, when the CCTV 100 generates a video by capturing a situation within the capture range, a plurality of frames that constitutes the video and detailed information including the identifier of the corresponding CCTV 100, a frame identifier and the capture time may be generated.

When the related image is transmitted, the detailed information is transmitted together. Unless the context clearly indicates otherwise, the present disclosure is not intended to exclude the transmission of the related detailed information from the operation of transmitting the image from the camera 100 to other component.

The multiple cameras 100 transmit the image to the image analysis server 300.

The image analysis server 300 is a plurality of computer systems or computer software implemented as a network image analysis server, and is configured to receive the image (for example, a video) generated by the multiple cameras 100 via a wired/wireless network. Here, the network image analysis server refers to a computer system and computer software (a network image analysis server program) connected to a low-level device capable of communicating with other network image analysis server via a computer network such as a private Intranet or an Internet to receive a task request, perform the task and provide the results. However, the network image analysis server should be understood as a broad concept including the network image analysis server program as well as a series of application programs running thereon, and in some cases, various types of databases built therein.

When the image analysis server 300 receives query information for detecting a target object, the image analysis server 300 may detect the target object by re-identifying the target object in the plurality of images based on the query information. For example, the re-identification module 310 may detect the target object by re-identifying the target object in other image. Additionally, the re-identification module 310 may trace the path of the target object.

Additionally, the image analysis server 300 updates the query information for tracing the target object based on the image of the detected target object. For example, the update module 330 may update the query information based on other image in which the target object is detected and a query image.

The query information update operation of the image analysis server 300 will be described in more detail below with reference to FIG. 4, etc.

The multi-camera system 1 may further include a database (not shown) to store the images. The image analysis server 300 may pre-store the images captured by the multiple cameras 100 in the database before receiving a query information update command, and search for an image that matches the target object related to the query information in the database when it receives the query information update command.

It will be obvious to those skilled in the art that the multi-camera system 1 may include other components not described herein. For example, the multi-camera system 1 may further include a data input device, an output device such as a display and/or a printer, a storage device such as memory, a network, a network interface and a protocol.

A method for updating query information for tracing a target object from multi-camera according to another aspect of the present disclosure is performed by a computing device including a processor. Here, the computing device is configured to communication with multiple cameras. For example, the computing device may be the image analysis server 300 of FIG. 2 which communicates with the multiple cameras 100. Hereinafter, for clarity of description, the method will be described in further detail based on the embodiments performed by the system 1 of FIG. 2.

FIG. 4 is a schematic diagram of the method for updating query information for tracing a target object from multi-camera according to another aspect of the present disclosure.

Referring to FIG. 4, the method for updating query information for tracing a target object from multi-camera (hereinafter, the query information update method) includes: receiving a query information update command including query information (for example, by the image analysis server 300) (S100).

The image analysis server 300 starts an operation for updating query information upon receiving the query information update command.

The query information is information for tracing the target object in a plurality of images captured by the multiple cameras. The query information includes at least one of a query image displaying the target object, features of the query image or attributes of the target object.

The query image may be a specific image among the images captured by the multiple cameras 100. For example, among the images captured by the multiple cameras 100, the specific image displaying the target object may be set as the query image by a user.

The query image may be the specific image itself or a patch including sub regions occupied by the target object in the specific image.

The features of the query image are unique geometric features of the corresponding object, and include, for example, edges, points and/or curves. The features may be implemented in the form of a feature map or a feature vector.

The features of the query image may be features used for a machine learning model for object recognition to recognize an object in an input image. The machine learning model may have a Convolution Neural Network (CNN), Recurrent Neural Network (RNN), Long Short-Term Memory models (LSTM) or Generative Adversarial Network (GAN) structure for extracting image features. When a patch of the target object is inputted to the machine learning model, the features of the query image may be image features extracted from the input patch by a feature extraction unit (for example, a Convolution filter) of the machine earning model.

The attributes of the target object are object information assigned to describe the target object. The attributes of the target object include shape attributes and/or activity attributes. The shape attributes include, for example, color and size of the object, an item worn on the object (for example, clothes, accessories, etc.), gender, age and joints information. The activity attributes include direction, speed and velocity. Additionally, the attributes of the target object may include shape-activity combination attributes. The combination attributes may include, for example, gait. The gait may include a walking speed and a walking pattern.

The query information update method includes: searching for a captured image of the target object among the images captured by the multiple cameras 100 (for example, by the re-identification module 310) (S200). The step of searching for the captured image of the target object is performed based on the query information received in the step S100.

When the image analysis server 300 receives the query information including the query image, the re-identification module 310 extracts the features of the query image from the query image, and searches for the captured image of the target object, different from the query image, among the images pre-captured by the multiple cameras 100 based on the extracted features of the query image (S200).

When the features of the corresponding image are very similar to the features of the query image at the level of the tolerance range, the image is determined to have captured the target object.

When as a result of image analysis, a preset condition is satisfied, the re-identification module 310 may determine the corresponding image as an image displaying the target object.

In an embodiment, the re-identification module 310 may calculate an object similarity score using the initial query image, and search for other captured image of the target object based on the calculated object similarity score. The object similarity score is a value obtained by scoring a matching level between the object detected in the other image and the target object in the query image.

The re-identification module 310 may calculate the object similarity score, for example, through a Euclidean similarity method, a cosine similarity method, a Mahalanobis similarity method or any other feature comparison method between objects.

The preset condition may be a specific threshold or a rank-1 matrix. When the calculated object similarity score is equal to or larger than the preset threshold, the re-identification module 310 determines that the corresponding object matches the target object. Alternatively, when the calculated object similarity score has the preset rank-1 matrix value, the re-identification module 310 determines that the corresponding object matches the target object.

Additionally, when the matching result between the attribute information associated with the object and the attribute information of the query information satisfies the preset condition, the re-identification module 310 may determine the corresponding image as an image displaying the target object.

In an embodiment, the re-identification module 310 may search for other captured image of the target object based on an attribute matching number or an attribute similarity score.

The attribute similarity score indicates a matching level between identical attribute items. When the calculated attribute similarity score is equal to or larger than a preset attribute threshold value, the re-identification module 310 determines that the attributes between objects match.

When each object has a plurality of attributes, the re-identification module 310 may calculate the attribute matching number by calculating the matching level for each attribute item.

In another embodiment, the re-identification module 310 may search for other captured image of the target object based on the joints information or gait information.

The image found to match the target object or information associated with the corresponding image is used to update the query information.

The query information update method includes: updating the query information based on the features of the found image and the features of the query image (for example, by the update module 330) (S300).

In an embodiment, when the query information update command includes the query image and does not include the features of the query image, the features of the query image may be extracted from the query image in the query information before the update S300. The feature extraction step is performed before the step S200 of searching for at least one image or the step S300 of updating the query information.

The extracted features of the query image may be used in the search step S200 and the update step S300, or may be used in the update step S300.

In an embodiment, the step S300 may include: obtaining new features of the query image based on the features of the image and the features of the query image (S310); and updating the query information based on the new features of the query image (S330).

In the step S310, the update module 330 obtains the new features of the query image based on the features of the image and the features of the query image. The features of the image for obtaining the new features of the query image are image features extracted from the at least one image found in the step S100. The features of the query image for obtaining the new features of the query image may be input features included in the query information or features extracted from the query image by the image analysis server 300 after the step S100.

In an embodiment, to obtain the new features of the query image, the update module 330 may calculate a representative value for the features of the at least one found image and the features of the query image as the new features of the query image (S310). Here, the representative value may be an average or maximum value of the features of the image and the features of the query image.

When the features of the image and the features of the query image are implemented as a vector (or a matrix), a representative vector (or matrix) having an average or maximum value between the corresponding components is calculated as the new features of the query image (S310). In this case, the new features of the query image may be updated as a single value into which a plurality of existing features is combined.

In another embodiment, the update module 330 may directly obtain, as the new features, at least some of the remaining features except the features that match the features of the query image among the features of the at least one found image. In this case, the new features of the query image may be updated to include at least some of the existing features and the new features with an addition of the new features obtained in the search process to the existing features. For example, when the number of the remaining features except the features that match the features of the query image among the features of the found image is N, the features of the corresponding query image may be updated to include the existing features and the N new features.

In an embodiment, the update module 330 may apply the input features to a fully connected layer pre-stored in the image analysis server 300 and obtain an output result of the fully connected layer as the features of the query image. The input features may be a concatenation of the features of the at least one found image and the features of the query image.

The fully connected layer may be a layer of networks trained to recognize an object from which the input features are extracted when the input features are applied. In an embodiment, the parameters of the fully connected layer may be trained to recognize the unique features of the object shared between the images of the input features more accurately.

When the number of images found to have captured the target object is one, the update module 330 may calculate the new features of the query image based on the features of the found image and the features of the query image (S310); and update the existing query information with the calculated new features (S330). When the number of images found to have captured the target object is multiple, the update module 330 may calculate the new features of each query image based on the features of each image and the features of the query image for each of the plurality of found images (S310); and update the existing query information with the calculated new features (S330). The update operation of the steps S310 and S330 may be repeated until all the found images are used to update.

For example, when first and second images are found, the update module 330 calculates first new features of the query image based on the features of the first image and the features of the query image (S310); and updates the existing query information with the calculated first new features (S330). Subsequently, the update module 330 calculates second new features of the query image based on the features of the second image and the features of the query image (S310); and updates the existing query information (i.e., the first new features) with the calculated second new features (S330).

Additionally, the update module 330 may update the existing query information with the plurality of query information (S300).

Figure 6A:
FIGS. 6A to 6C show a process of updating query information for poses according to an embodiment of the present disclosure.
Figure 6B:
Figure 6C:

FIGS. 6A to 6C show a process of updating query information for poses according to an embodiment of the present disclosure.

Referring FIGS. 6A to 6C, the update module 330 obtains many new query image by comparing the features of the single query image with the features of the captured other images. The query information for each object (shown in FIGS. 6A to 6C) extend from the feature range of poses of the single image to the feature range of various poses of multiple images.

Figure 7:
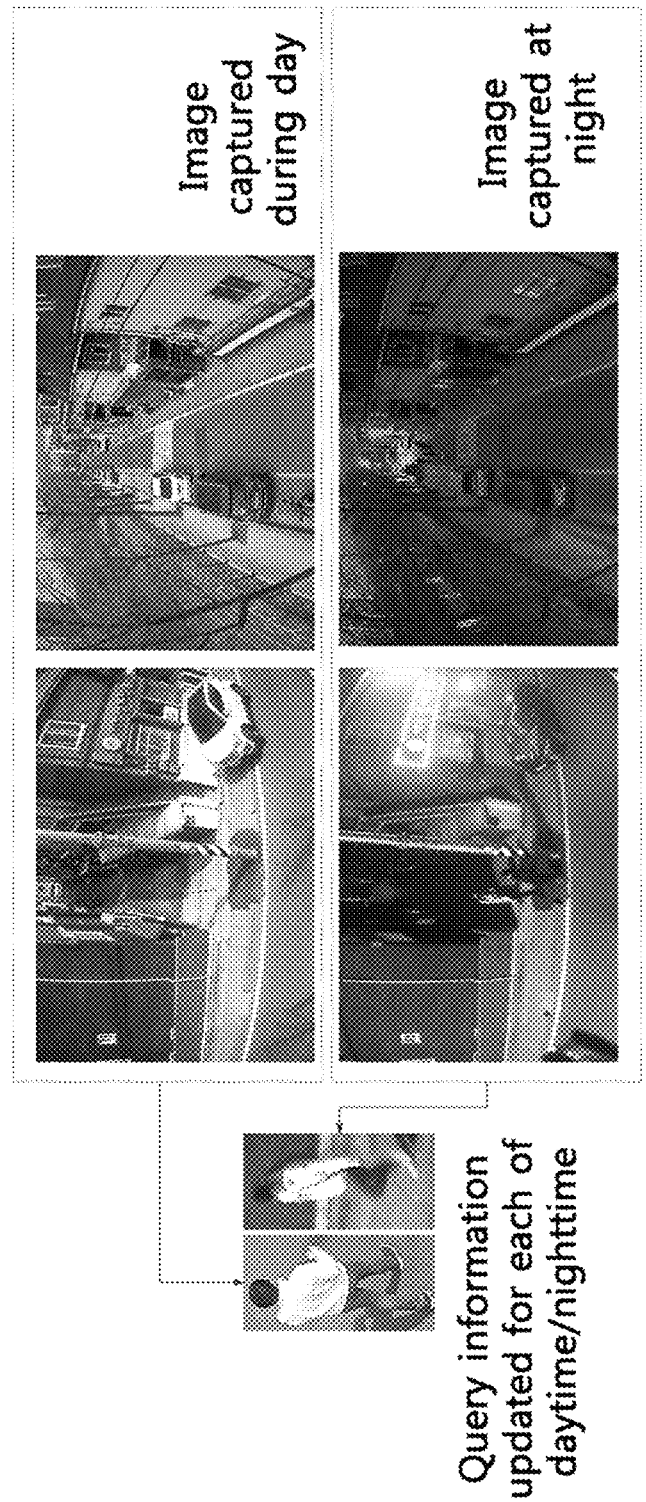
FIG. 7 is a schematic diagram of a process of updating query information for each capture time slot according to an embodiment of the present disclosure.

FIG. 7 is a schematic diagram of a process of updating query information for each capture time slot according to an embodiment of the present disclosure.

Referring to FIG. 7, the query information update method may further include classifying the at least one image found in the step S200 for each preset capture time slot based on the capture time information in the query information. To this end, the query information further includes capture time information of the camera 100.

In an embodiment, the capture time slot may be set on the basis of a point having a relative large change in background luminance for each capture time in a background luminance distribution in one day. For example, the capture time slot may include daytime and nighttime having a large luminance change. The daytime and nighttime may be divided by sunrise/sunset time.

The multiple cameras 100 may capture an image captured at daytime and an image captured at nighttime. When the image captured at daytime/nighttime is provided to the image analysis server 300, in case that the capture time of each of the at least one image found in the step S200 belongs to the daytime, the image analysis server 300 classifies the corresponding image as the image captured at daytime.

When the query information including the capture time information is inputted and the capture time slot of the found image is determined, the update module 330 may generate the new features of the query image for each capture time slot to update the query information for each capture time slot (S310). In the above example, the update module 330 may generate the new features of the query image for daytime based on the features of the image belonging to the daytime and the features of the query image, and the new features of the query image for nighttime based on the features of the image belonging to the nighttime and the features of the query image. The update module 330 updates the query information based on the new features of the query image for daytime and the new features of the query image for nighttime (S330). Then, the query information is updated with the plurality of query information of the plurality of day/night times.

Figure 8A:
FIGS. 8A to 8C are schematic diagrams of a process of updating query information for each camera specification according to an embodiment of the present disclosure.
Figure 8B:
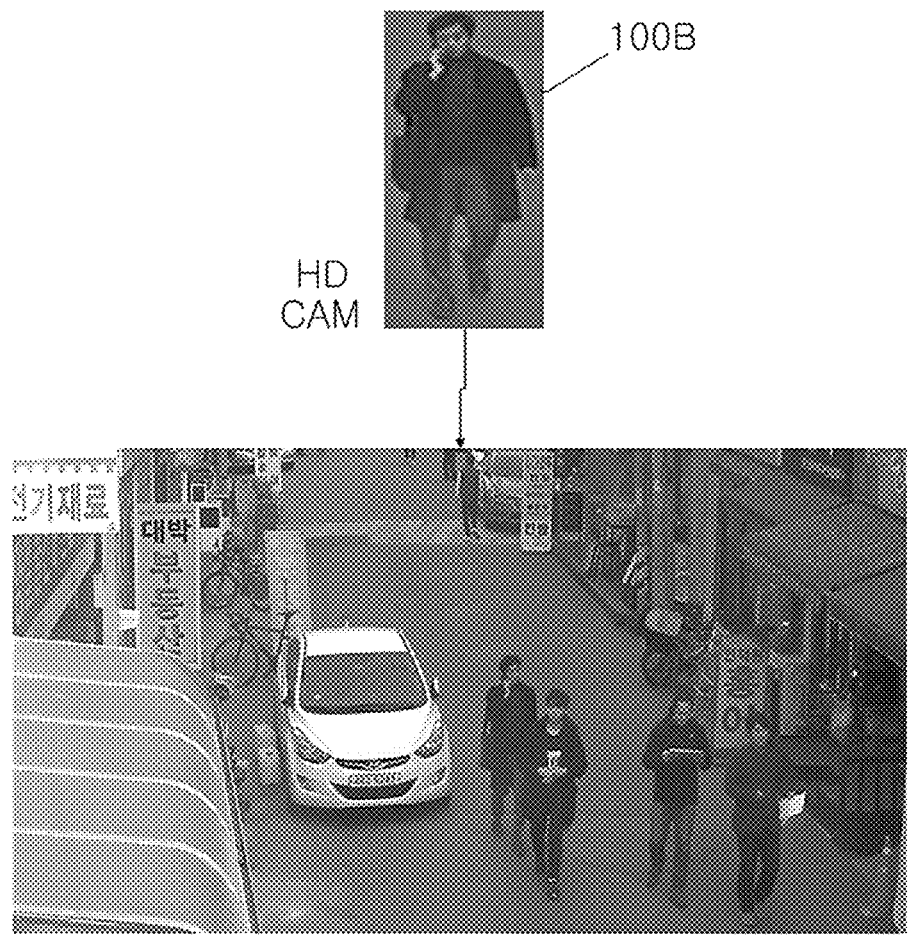
Figure 8C:
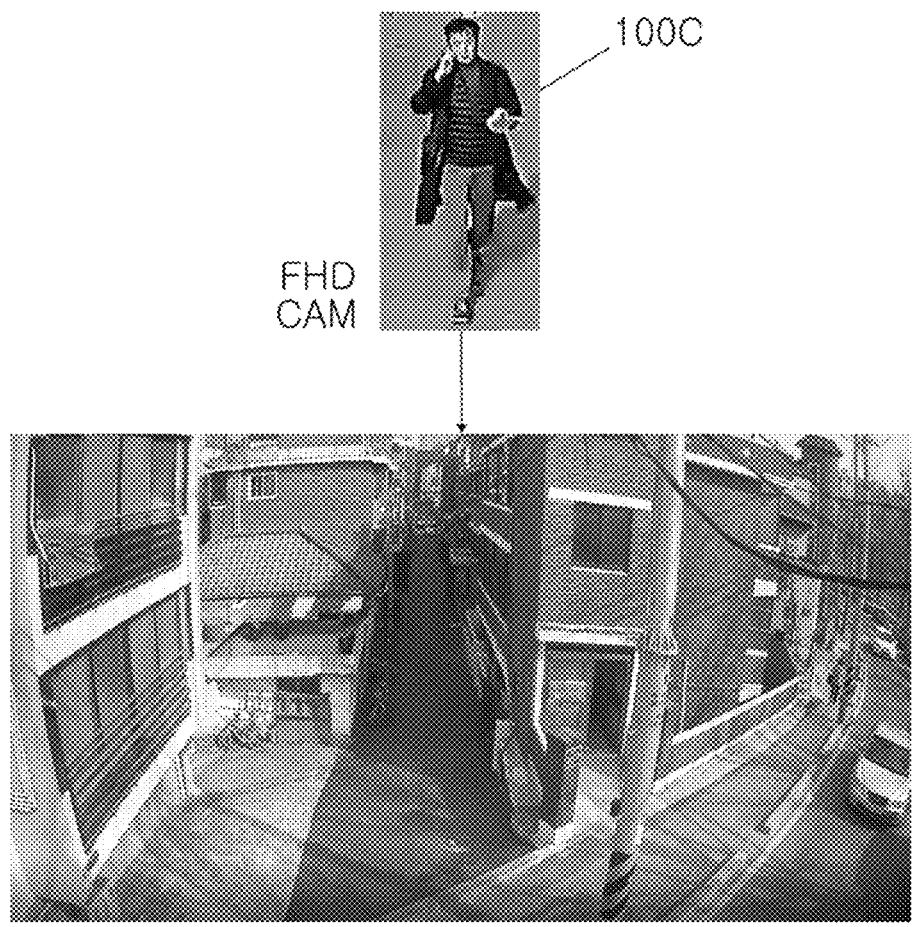

FIGS. 8A to 8C are schematic diagrams of a process of updating query information for each camera specification according to an embodiment of the present disclosure.

Referring to FIGS. 8A to 8C, the query information update method may further include classifying the at least one image found in the step S200 for each camera specification based on the camera specification information in the query information. To this end, the query information further includes specification information of the camera 100.

In an embodiment, the specification information of the camera may include at least one of camera type, image format, pixel or resolution.

In an example, when images are obtained from first to third cameras 100A to 100C, the camera specification information includes specification information of the first camera 100A, specification information of the second camera 100B and specification information of the third camera 100C. The specification information of the first camera 100A may include type information indicating a Standard Definition (SD) camera, pixel information indicating 300,000 pixels and resolution information indicating 720×480 resolution as shown in FIG. 8A. The specification information of the second camera 100B may include type information indicating a High Definition (HD) camera, pixel information indicating 1,000,000 pixels and resolution information indicating 1280×720 resolution as shown in FIG. 8B. The specification information of the third camera 100C may include type information indicating a Full-HD (FHD) camera, pixel information indicating 2,000,000 pixels and resolution information indicating 1920×1080 resolution as shown in FIG. 8C.

When the image for each camera specification is provided to the image analysis server 300, the image analysis server 300 classifies the at least one image found in the step S200 based on the specification corresponding to the at least one found image.

When the query information including the camera specification information is inputted and the found image is classified for each specification, the update module 330 may generate the new features of the query image for each specification (S310). The features for each specification are generated for each specification item.

In the above example, the update module 330 may generate the new features of the query image for the SD camera based on the features of the image corresponding to the SD camera and the features of and the query image; the new features of the query image for the HD camera based on the features of the image corresponding of the HD camera and the features of the query image; and the new features of the query image for the FHD camera based on the features of the image corresponding to the FHD camera and the features of the query image. Then, the query information is updated with the plurality of query information for each camera type.

Likewise, in the above example, the update module 330 may generate the new features of the query image for each pixel and the new features of the query image for each resolution, and update the query information with the plurality of query information for each pixel and each resolution.

When the images of FIGS. 8A to 8C are provided, the image analysis server 300 may update the existing query information with the nine new query information.

As a result of updating the query information considering a variety of aspects of the query image, the target object tracing performance of the multi-camera system 1 is improved.

Figure 9:
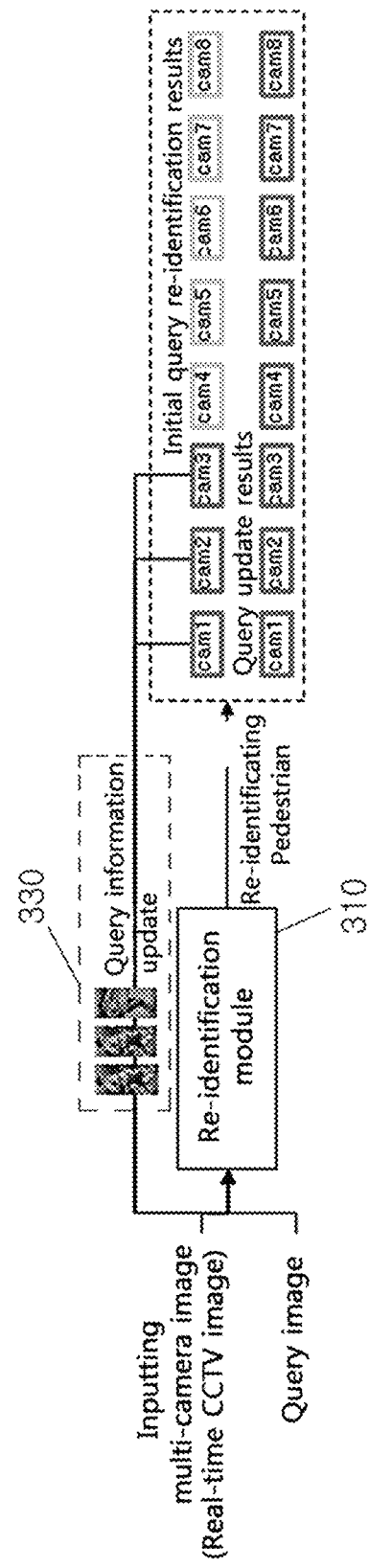
FIG. 9 is a diagram showing query information update results according to an embodiment of the present disclosure.
Figure 10:
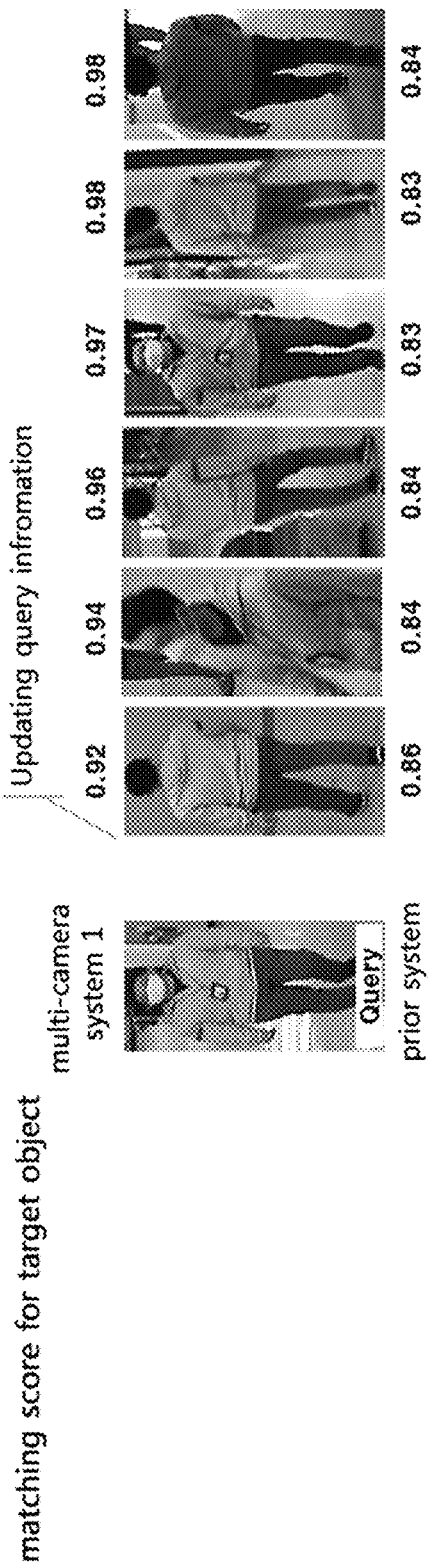
FIG. 10 shows the effect of improving search performance by updating query information according to an embodiment of the present disclosure.

FIG. 9 is a diagram showing the query information update results according to an embodiment of the present disclosure. FIG. 10 shows the effect of improving search performance by updating query information according to an embodiment of the present disclosure.

FIG. 9 depicts a situation in which all eight cameras of the multi-camera system 1 capture the target object, but before updating the query information, the target object is only traced in images captured by three cameras. When the query information is updated, it is possible to trace the target object in images captured by the remaining five cameras in which it was impossible to trace the target object before the update. This effect is supported by the improvement of the matching score compared to before updating the query information, as shown in FIG. 10.

The operation by the multi-camera system 1 and the method according to the embodiment as described hereinabove may be, at least in part, implemented in a computer program and recorded in a computer-readable recording medium. For example, it may be implemented with a program product including computer-readable medium having program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage and networking component (either wireless or wired). The computer may run an operating system (OS) such as, for example, OS that is compatible with Microsoft Windows, Apple OS X or iOS, Linux distribution or Google Android OS.

The computer-readable recording medium includes all types of record retrieval devices in which computer-readable data is stored. Examples of the computer-readable recording medium include read only memory (ROM), random access memory (RAM), compact disc read only memory (CD-ROM), magnetic tape, floppy disk and optical data storage and retrieval devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

The invention claimed is:

1. A method for updating query information for tracing a target object, performed by a system including multiple cameras and an image analysis server, the method comprising:
   receiving a query information update command including query information for tracing the target object from the multiple cameras, the query information including at least one of a query image displaying the target object, features of the query image extracted from the query image, or attributes of the target object;
   searching for at least one image displaying the target object among a plurality of images captured by the multiple cameras;
   updating the query information of the query image based on the at least one found image, the updating the query information comprising obtaining new features of the query image based on first features of the at least one found image extracted from the plurality of images and the features of the query image; and obtaining new features of the query image by obtaining, as the new features of the query image, an output result calculated by applying input features to a fully connected layer pre-stored in the image analysis server, wherein the input features are a concatenation of the first features of the at least one found image and the features of the query image.

2. The method according to claim 1, further comprising:
extracting the features of the query image from the query image, before searching for the at least one image or updating the query information, when the query information update command includes the query image and does not include the features of the query image.

3. The method according to claim 2, wherein updating the query information comprises:
updating the query information based on the new features of the query image.

4. The method according to claim 3, wherein obtaining the new features of the query image comprises:
calculating a representative value for the first features of the at least one found image and the features of the query image as the new features of the query image, wherein the representative value is an average or maximum value of a feature value of the image and a feature value of the query image.

5. The method according to claim 3, wherein obtaining the new features of the query image comprises:
directly obtaining, as the new features, at least some of remaining features except the features that match the features of the query image among the first features of the at least one found image.

6. The method according to claim 3, wherein the query information further includes capture time information of the camera,
the method further comprises:
classifying the at least one found image based on the capture time information in the query information for each preset capture time slot, and
wherein obtaining the new features of the query image comprises generating the new features of the query image for each capture time slot to update the query information for each capture time slot.

7. The method according to claim 6, wherein the capture time slot is set on the basis of a point having a relatively large change in background luminance for each capture time in a background luminance distribution in one day.

8. The method according to claim 3, wherein the query information further includes specification information of the camera,
the method further comprises:
classifying the at least one found image based on the specification information in the query information for each specification of the camera, and wherein obtaining the new features of the query image comprises generating the new features of the query image for each specification of the camera to update the query information for each specification.

9. The method according to claim 8, wherein the specification information of the camera includes at least one of camera type, image format, pixel or resolution.

10. The method according to claim 1, wherein searching for the at least one image displaying the target object comprises:
determining each image of which image features match the features of the query image as an image displaying the target object, for each of the plurality of images obtained from the multiple cameras.

11. The method according to claim 1, wherein searching for the at least one image displaying the target object comprises:
determining an object in each image as the target object based on a matching level or a matching number between attributes of the corresponding object and the attributes of the target object, for each of the plurality of images obtained from the multiple cameras.

12. The method according to claim 1, wherein the fully connected layer is pre-trained to increase an importance of unique features shared between an object having the input features and the target object.

13. A computer-readable recording medium having recorded a program for performing the method according to claim 1.

14. A multi-camera system, comprising:
multiple cameras to capture an object to generate an image; and
an image analysis server to receive the images from the multiple cameras, the image analysis server is configured to:
receive a query information update command including query information for tracing a target object from the multiple cameras, lithe query information including at least one of a query image displaying the target object, features of the query image extracted from the query image, or attributes of the target object;
search for at least one image displaying the target object among the plurality of images captured by the multiple cameras;
update the query information of the query image based on the at least one found image, the update of the query information comprising obtaining new features of the query image based on first features of the at least one found image extracted from the plurality of images and the features of the query image; and
obtain new features of the query image by obtaining, as the new features of the query image, an output result calculated by applying input features to a fully connected layer pre-stored in the image analysis server, wherein the input features are a concatenation of the first features of the at least one found image and the features of the query image.

* * * * *